United States Patent
Cook et al.

(10) Patent No.: US 9,868,409 B2
(45) Date of Patent: Jan. 16, 2018

(54) POWER MANAGEMENT AND ENVIRONMENTAL CONTROL SYSTEM FOR VEHICLES

(71) Applicants: Vanner, Inc., Hilliard, OH (US); Automotive Climate Control, Inc., Elkhart, IN (US)

(72) Inventors: Alexander Cook, Dublin, OH (US); Alexander Moultanovsky, Mishawaka, IN (US); William Casey Cummings, Elkhart, IN (US)

(73) Assignees: VANNER, INC., Hilliard, OH (US); AUTOMOTIVE CLIMATE CONTROL, INC., Elkhart, IN (US)

( * ) Notice: Subject to any disclaimer, the term of this patent is extended or adjusted under 35 U.S.C. 154(b) by 313 days.

(21) Appl. No.: 14/627,615

(22) Filed: Feb. 20, 2015

(65) Prior Publication Data
US 2015/0336522 A1    Nov. 26, 2015

Related U.S. Application Data

(60) Provisional application No. 62/001,852, filed on May 22, 2014.

(51) Int. Cl.
*H02J 1/10* (2006.01)
*B60R 16/033* (2006.01)
(Continued)

(52) U.S. Cl.
CPC .......... *B60R 16/033* (2013.01); *B60R 16/03* (2013.01); *H02M 3/04* (2013.01); *H02M 7/44* (2013.01); *Y10T 307/391* (2015.04)

(58) Field of Classification Search
CPC .................................................... B60R 16/033
(Continued)

(56) References Cited

U.S. PATENT DOCUMENTS

| | | | |
|---|---|---|---|
| 2005/0151517 A1* | 7/2005 | Cook | B60R 16/03 323/207 |
| 2011/0215641 A1 | 9/2011 | Peterson et al. | |

(Continued)

OTHER PUBLICATIONS

European Search Report, Application EP15156314 dated Oct. 1, 2015.

(Continued)

*Primary Examiner* — Lincoln Donovan
*Assistant Examiner* — Metasebia Retebo
(74) *Attorney, Agent, or Firm* — James R. Eley; Ronald J. Koch; Eley Law Firm Co. LPA

(57) ABSTRACT

A power management system with DC/AC converter for providing power to electrical heating, ventilating and air-conditioning system, having a first electrical power interface (EPI) and a second EPI. Optional DC/DC converter having a third EPI and a fourth EPI, the third EPI being electrically coupled to the second EPI. A switching arrangement of the system has a common connection, the common connection being configured to be coupled to an electromagnetic machine, a first connection selectively electrically coupled to the common electrical connection, the first electrical connection further being electrically coupled to the second EPI and the third EPI, and a second electrical connection selectively electrically coupled to the common electrical connection, the second electrical connection further being electrically coupled to the fourth EPI. The first EPI, the second EPI, the third EPI, the fourth EPI and the common electrical connection are configurable as electrical power inputs and outputs.

32 Claims, 6 Drawing Sheets

(51) Int. Cl.
H02M 3/04 (2006.01)
H02M 7/44 (2006.01)
B60R 16/03 (2006.01)

(58) Field of Classification Search
USPC .......................................................... 307/29
See application file for complete search history.

(56) References Cited

U.S. PATENT DOCUMENTS

2012/0112547 A1* 5/2012 Ghosh .................... H02J 9/062
  307/66
2016/0241154 A1* 8/2016 Donescu ............... H02M 5/458

OTHER PUBLICATIONS

Alexander Cook et al, "The Road to Electrification for Specialty Vehicles", 2008 IEEE International Conference on Vehicular Electronics and Safety, Sep. 1, 2008, pp. 103-107, ISBN: 978-1-4244-2359-0, DOI: 10.1109/ICVES.2008.4640908.

* cited by examiner

POWER MANAGEMENT AND ENVIRONMENTAL CONTROL SYSTEM FOR VEHICLES

This application claims priority to U.S. provisional application No. 62/001,852, filed May 22, 2014, the contents of which are hereby incorporated by reference.

FIELD

The present invention relates generally to a system for providing and governing vehicle electrical power. In particular the invention relates to a system for providing AC electrical power to an onboard environmental control system.

BACKGROUND

A conventional vehicle environmental control system typically comprises a mechanically-driven compressor for an air conditioning system, as well as an alternator to charge a storage battery, augment power supplied by the battery, and power electrical fans to circulate air for the air conditioning system. In such arrangements a prime mover engine of the vehicle must be operating for the air conditioning system to function. This type of environmental control system has a number of shortcomings when installed in vehicles such as buses and ambulances. Firstly, mounting kits for the compressors are relatively complex and often vary between manufacturers. In addition, the compressors themselves typically require regular maintenance and often have reliability issues. Furthermore, the alternators are relatively unreliable, expensive and inefficient. High idle from an associated prime mover engine of the vehicle may also be required to operate the compressor in a manner sufficient to achieve adequate cooling, thereby resulting in relatively poor fuel economy for the vehicle.

In contrast, electrically-driven air conditioning systems have benefits in terms of installation flexibility and simplified belt drives between the air conditioning system and the vehicle's engine. As used herein, the term "air conditioning" is used in the broadest sense and is not meant to preclude air heating and filtrating functions affecting a vehicle's environmental air supply. Electrically-driven air conditioning systems also have further benefits over engine-driven systems, such as improved reliability and durability, substantially reduced failure modes, and reduced warranty costs. A further advantage of electrically-driven air conditioning systems over engine-driven systems is increased capacity and coefficient of performance (COP) which is described in Equation 1:

$$COP = \frac{Q}{W} \quad \text{Equation 1}$$

where Q is the average heat removed through an evaporator of the air conditioning system (evaporator cooling capacity) divided by W, the average work input to the compressor. It is important to note that increased capacity and COP can be achieved without changing the evaporator or condenser of the electrically-driven air conditioning system.

Electrically driven air conditioning systems also offer the opportunity to have full cooling capacity at engine idle, eliminating the need for "high idle," improving overall system efficiency and life expectancy of the cooling system as well as the overall system. This is particularly true if the air conditioning systems are combined with additional direct-current (DC) electrical power and with a heating component, such as electrical heating powered from one of the electrical power buses in the system or a fuel-fired heating system fueled from a fuel tank of the vehicle. The benefits of this arrangement include "instant-on" heat while the engine is cold and reduced thermal load on the engine, which can be a problem for vehicle emissions. In addition, engine heating can be provided.

Many vocational vehicles have additional electrical loads that are required to be operational on the vehicle for the vehicle to be effective for its intended purpose. In addition to DC power, portable alternating-current ("AC") electrical power is often a necessary resource for many specialized vehicles. For example, emergency vehicles often require AC power to operate medical equipment carried onboard the vehicle. AC power is likewise used in utility, construction vehicles and fire trucks to operate various kinds of tools and equipment. AC power may also be used to operate wheelchair lifts on buses. Another common use for vehicle-based AC power is in long-haul transport tractor-trailer trucks equipped with a sleeper compartment wherein AC power may be used to operate convenience accessories such as electric razors, televisions and microwaves. AC power is also the most convenient form of power for driving a motor and air conditioning compressors, in particular, are most readily available integrated with AC motors. These motors are well-established as highly reliable and relatively low-cost components. Refrigerated vehicles can also benefit greatly from this AC power technology.

Ambulances have relatively high-capacity needs for air conditioning on a relatively small vehicle. Because they provide cooling for both the cab and the rear patient compartment, they require augmentation to the basic vehicle platform on which they are typically built. There is also a requirement for increased electrical power capacity to operate lights, a power inverter such as a DC-AC inverter to run medical devices, and so on. This requirement conflicts with the design of the base vehicle, which is built so as to satisfy a wider market, particularly with today's drive for improved fuel economy.

Increasing efficiency, fuel economy, and environmental needs are also increasingly requiring capability to use the vehicle's accessories without operating the vehicle's engine. This often requires "export power" from the electrical system to run electrified accessories or loads such as a refrigerated body, leading to a need for greater energy storage and management of that resource. This is particularly the case for vehicles wherein the prime mover engine typically idles for considerable periods of time, such as shuttle buses, delivery trucks, and ambulances. Other benefits from reducing or eliminating idling are reduced maintenance costs and improved reliability, which is often quantified in terms of "mean time between failures" (MTBF).

Static inverters are commonly used to generate portable AC electrical power output from a DC power source input. Such inverters are relatively lightweight and have few, if any, moving parts to wear out. In addition, inverters do not require a fueled engine (such as the vehicle's prime mover) to produce power, are quiet, and do not produce fumes. Inverters are also more efficient than comparable power sources, such as motor-driven generators. However, inverters suffer from a limitation in that their output power, measured in volt-amps ("VA") or watts, may be constrained under some conditions. For example, an inverter that derives its input power from a vehicle's alternator system may not be able to deliver the full amount of electrical power demanded by a load when the vehicle is at idle, since the power delivery capacity of an alternator varies directly with the vehicle's engine speed.

Aside from the need to generate AC power there is a desire on the part of many vehicle manufacturers to increase the "electrification" of vehicles, i.e., reducing the number of accessories that depend directly on the fueled-engine as a mechanical prime mover. Example accessories include power steering pumps, hydraulic drives, engine cooling fans, air conditioning compressors, oil and coolant pumps, and air compressors. Advantages of accessory electrification include a reduction in engine loading, which facilitates greater engine performance, increased flexibility in locating and mounting the accessories in the vehicle (particularly as available space in the engine compartment becomes more scarce), reduced fuel consumption, operation of pumps at an optimal speed independent of engine speed, more efficient accessory operation made possible by optimizing the location and wiring of the accessories, simplified plumbing, reduced environmental impact, and reduced vehicle emissions corresponding to reduced engine loading and fuel consumption.

Some vehicles may have several battery power supplies. For example, a vehicle may have a first battery system or an ultra-capacitor for operating a starter to "crank," or start, the prime mover engine, and a second battery system for powering accessories. The discharge and load characteristics can vary considerably between the cranking and accessory batteries. For example, cranking batteries and ultra-capacitors are intended to provide high current for a relatively short period of time to start the engine, while the accessory batteries are used to provide a smaller amount of current to the vehicle's accessories for a relatively long period of time. Accordingly, the accessories may be powered by a "deep cycle" battery configured to have a long cycle life (e.g., from substantially full charge to substantially discharged) rather than high current delivery. The types of batteries used for cranking and for powering accessories may also differ. For example, a cranking battery may use flooded lead-acid batteries while the accessory battery may use deep-cycle absorbed glass mat ("AGM") batteries. Each type of battery can have differing charge requirements. Likewise, ultra-capacitors may be employed in vehicle electrical systems in lieu of conventional batteries to serve as the cranking power source.

There is a need for a way to control battery charging to an amount appropriate for each battery in a vehicle electrical system having multiple batteries. There is a further need for a way to control and route power between multiple power supplies and distribution buses in a vehicle in order to supply and augment the buses and charge the batteries as needed or desired. There is also a need to manage the discharge and recharge of the batteries to minimize engine run time, and optimize battery life.

There are also systems in the field that use electrically driven air conditioners powered from battery supplies, the batteries being recharged by the standard vehicle prime mover engine's alternator. There are numerous problems associated with such systems. Firstly, the conventional vehicle electrical system voltage is lower than optimum for a typical air conditioning compressor, as the compressor requires a significant amount of power to drive it. In addition, the alternator is challenged to recharge the batteries while also supplying the air conditioning power. More typically, the air conditioning cannot be used while the vehicle is being driven. Furthermore, the cooling available is often limited in order to limit the current drawn by the compressor. Electrically-driven air conditioning systems also have a relatively limited time duration of operation due to factors such as limitations relating to battery size. A further drawback is that the batteries for these systems are often relatively large and heavy because of the intended "overnight" operation capability of the air conditioning systems. The systems are also relatively inefficient, as they use alternators designed for low cost with old technology rather than performance. Additionally, the systems place a relatively heavy burden on the vehicle electrical system, consequently reducing the system's reliability.

As can be seen from the foregoing discussion, there is a need for a power management and environmental control system that addresses the drawbacks and limitations of current systems.

SUMMARY

A power and environmental management system for a vehicle is disclosed according to several embodiments of the present invention. The system may be flexibly configured using various arrangements of environmental control systems, DC to AC inverters, DC to DC converters, AC to DC converters, one or more batteries, and a controller to provide a primary AC power bus, and a primary DC power bus. The controller monitors the status of the buses, the energy demands of the environmental control system, the state of charge of the batteries, inverters and converters and then controls the operation of the inverters and converters to supply and regulate the power supplied by the buses. The controller may also interact with the vehicle to provide automatic stop-start of the vehicle's functionality based on the needs of the power system and environmental controls. The inverters and converters may be bidirectional, allowing power to be transferred between buses and hence manipulate the contribution of each of the power sources to optimize the total system performance. In addition, the power buses can be configured to control recharging of the batteries in a manner optimizing the life of the batteries and improving the efficiency of the system.

The disclosed system provides a number of benefits including, but not limited to, simplified installation of air conditioning and heating systems (HVAC), reduced complexity of engine-mounted componentry, improved reliability and durability, increased HVAC capacity, reduction or elimination of high idle operation, reduced engine run time with attendant benefits, improved efficiency, and the ability to include integrated alternate power sources, such as solar and shore power. As an alternative to reduction or elimination of "high idle" the increased capability provided by the present invention may be used to provide other benefits such as increased power output or use of a smaller generator.

An aspect of the present invention is a power management system for a vehicle. The system comprises a high-voltage DC power bus, a DC to AC inverter connected between the high-voltage DC power bus and a primary AC power bus where the AC power bus is used to drive an environmental control system, a DC to AC inverter connected between the high-voltage DC power bus and a secondary AC power bus where the secondary AC power bus is used to drive vehicle accessories, and can be connected to external power to power the system. The power management system may also include a solar power component and an array regulator, a first DC to DC converter connected between the high-voltage DC power bus and a first battery, wherein the first DC to DC converter and the first battery are further connected to a primary DC power bus, a second DC to DC converter connected between the primary DC power bus and a second battery, wherein the second DC to DC converter and the second battery are further connected to a secondary DC power bus, and a controller. The controller monitors the status of at least one of the high-voltage DC power bus, environmental control system, first DC to AC inverter, primary AC power bus, environmental control system, second DC to AC inverter, secondary AC power bus, first DC to DC converter, first battery, primary DC power bus, second DC to DC converter, second battery and secondary DC power bus. The controller also controls the operation of at least one of the first DC to AC inverter, second DC to AC inverter, first DC to DC converter and second DC to DC converter to supply and/or regulate at least one of the voltage and current of at least one of the primary AC power bus, secondary AC power bus, primary DC power bus and secondary DC power bus. In cases where the battery generator and compressor drive are adequately sized, the DC to DC converter portion of the circuit may be unnecessary.

Another aspect of the present invention is a power management system for providing AC power to an environmental control system on a vehicle. The system comprises a DC to AC inverter connected between an DC power source and an AC power bus, where the AC power bus is used to drive an environmental control system, a first battery connected to the DC power source, wherein the first battery is further connected to a primary DC power bus, a DC to DC converter connected between the primary DC power bus and a second battery, wherein the DC to DC converter and the second battery are further connected to a secondary DC power bus, and a system controller. The system controller monitors the status of at least one of the DC power source, DC to AC inverter, AC power bus, environmental control system, first battery, primary DC power bus, DC to DC converter, second battery and secondary DC power bus. The system controller also controls the operation of at least one of the DC to AC inverter and the DC to DC converter, and to control the supply and regulation of at least one of the voltage and current of at least one of the AC power bus, primary DC power bus and secondary DC power bus. The system controller also controls a controller/rectifier to adjust the output as required to optimize the power flow to the primary DC power bus and respond to the state of charge of the first battery. The system controller also monitors the state of charge of one or more of the batteries as well as information from the electrical system and other components on the vehicle to start the engine and stop the engine as appropriate A further aspect of the invention is using an electromagnetic machine both as a charging device and as a motor to start the engine, in which case the electromagnetic machine is configured as a motor-generator. In this arrangement a controller/rectifier is operated in reverse to use energy from one or more batteries to cause rotation of the motor-generator and start the engine, thus enabling a reduction in the number and/or capacities of the system batteries.

In one embodiment of the present invention a power management for providing AC power to an environmental control system includes a DC/AC converter having a first electrical power interface (EPI) and a second EPI. The system further includes a DC/DC converter having a third EPI and a fourth EPI, the third EPI being electrically coupled to the second EPI. A switching arrangement of the system has a common electrical connection, the common electrical connection being configured to be coupled to an electromagnetic machine, a first electrical connection selectably electrically coupled to the common electrical connection, the first electrical connection further being electrically coupled to the second EPI and the third EPI, and a second electrical connection selectably electrically coupled to the common electrical connection, the second electrical connection further being electrically coupled to the fourth EPI. The first EPI, the second EPI, the third EPI, the fourth EPI and the common electrical connection are configurable as electrical power inputs and electrical power outputs.

In another embodiment of the present invention a power management system for providing AC power to an environmental control system includes a DC/AC converter having a first EPI and a second EPI. A first DC/DC converter of the system has a third EPI and a fourth EPI, the third EPI being electrically coupled to the second EPI. A fifth EPI is configured to be coupled to an electromagnetic machine (EMM), the fifth EPI further being electrically coupled to a select portion of the power management system. A second DC/DC converter of the system has a sixth EPI and a seventh EPI, the sixth EPI being electrically coupled to the fourth EPI. The first EPI, the second EPI, the third EPI, the fourth EPI, the fifth EPI, the sixth EPI and the seventh EPI are configurable as electrical power inputs and electrical power outputs.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
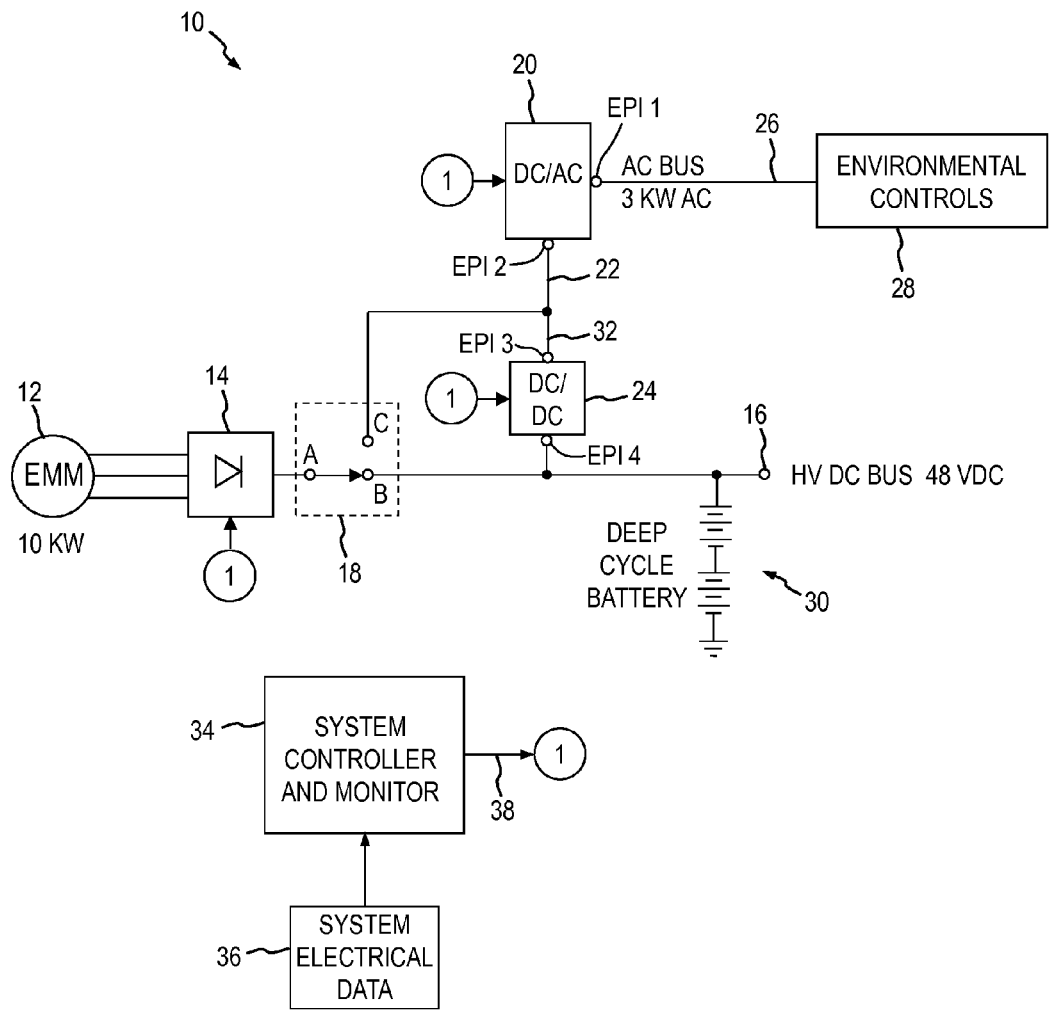
FIG. 1 is a schematic block circuit diagram of the basic topology of a power management and environmental control system according to an embodiment of the present invention.

In the discussion that follows and in the accompanying figures, like reference numerals are used to indicate components having substantially the same structure or function. In addition, in the figures, a numeral within a circle indicates a common point of connection for an attached structure or functional block. For example, each component in a given figure having a connection to or from an encircled (1) are logically and/or electrically connected together.

The present invention comprises varying configurations of a vehicle power management and environmental control system as discussed below and shown in the accompanying figures. The preferred configuration of the power management system for a particular vehicle depends upon the type and quantity of input power available and the output power requirements for the vehicle.

Figure 2:
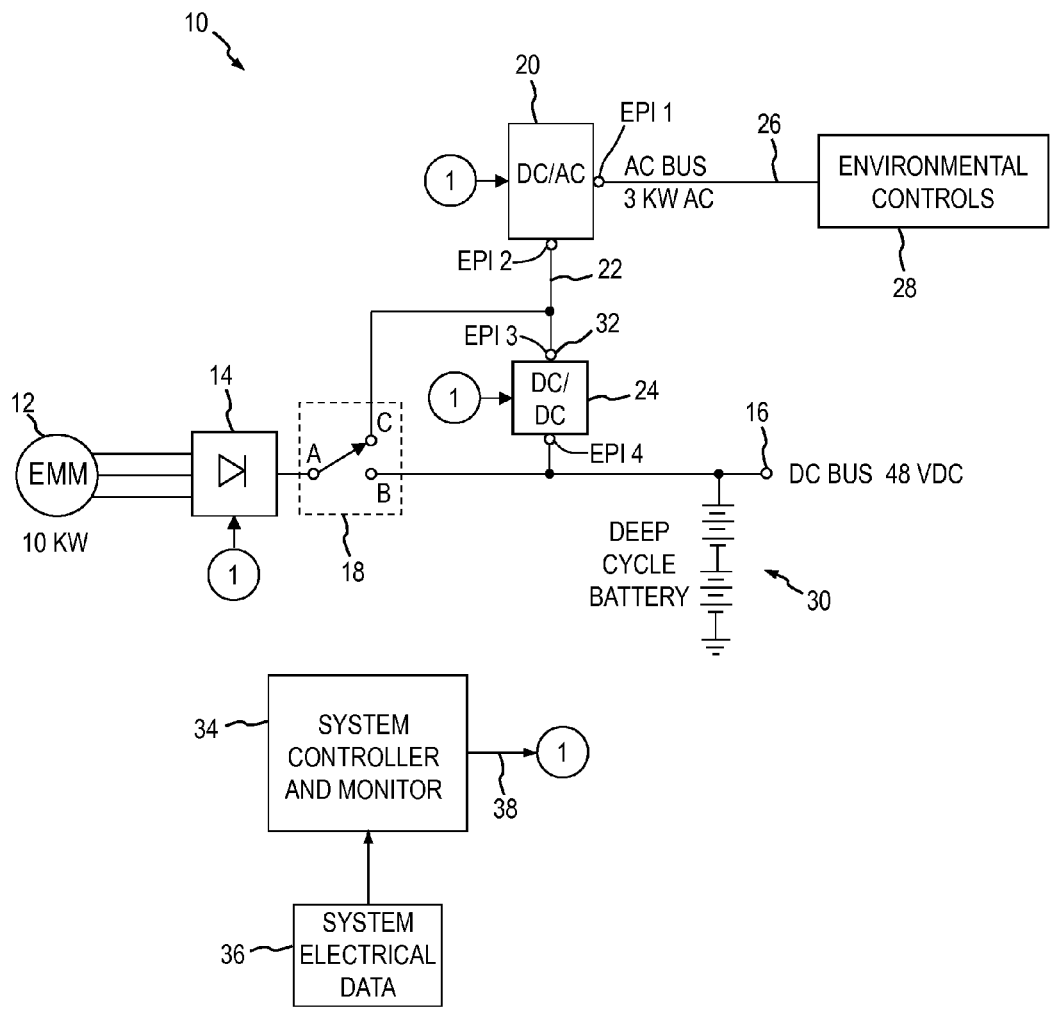
FIG. 2 shows an alternate arrangement of the system of FIG. 1.

With reference to FIGS. 1 and 2, a power management and environmental control system 10 is shown according to an embodiment of the present invention. High-voltage AC, shown as 10 kW in the figures, is generated by an electromagnetic machine (hereafter EMM) 12, which can be described, for example, as an alternator, generator, or motor/generator unit (MGU) of sufficient capacity. EMM 12 can be designed using various technologies such as permanent magnets, switched reluctance, and induction. The high-voltage AC is provided to a controller/rectifier 14, which rectifies and regulates the high-voltage AC to a corresponding DC voltage, thus forming a high-voltage DC power bus 16. A relatively high-voltage type EMM 12 and bus 16 are preferable for increased EMM efficiency, load efficiency, and for voltage-changing flexibility and efficiency during subsequent power conversion.

The system of FIGS. 1 and 2 may be configured in various ways, as detailed further below. A switch 18 is shown in the figures for the purpose of illustrating several of these configurations. However, switch 18 may be substituted with any switching arrangement that provides a suitable electrical connection including, without limitation, relays, terminal blocks, jumper wires, and hard-wired connections. The system of FIGS. 1 and 2 may be provided in a reconfigurable arrangement, such as with switch 18. Alternatively, the system may be provided in a substantially non-reconfigurable arrangement, such as with hard-wired connections.

With reference to FIG. 1, in a first position of switch 18 a first, common electrical connection "A" and a second electrical connection "B" of the switch are electrically connected together while a third electrical connection "C" of the switch is electrically isolated from electrical connections A and B. In this switch 18 position a DC-to-AC ("DC/AC") converter (interchangeably, "inverter") 20 receives input DC voltage 22 from high-voltage bus 16 via an optional first DC-to-DC ("DC/DC") converter 24 and converts the input DC voltage to an AC output voltage that is coupled to an AC power bus 26 to provide electrical power to a vehicle environmental control 28 connected to the AC power bus. A first battery 30 receives current from high-voltage bus 16 during charging, and delivers current to the high-voltage bus when the EMM does not deliver enough current or is off.

With reference now to FIG. 2, in a second position of switch 18 common electrical connection "A" and third electrical connection "C" of the switch are electrically connected together while second electrical connection "B" of the switch is electrically isolated from electrical connections A and C. In this switch 18 position controller/rectifier 14 is connected to a "higher voltage" side 32 of first DC/DC converter 24 when the first DC/DC converter is bidirectional, thus allowing operation of the EMM at a higher voltage for greater efficiency. This configuration also separates the operation of EMM 12 and controller/rectifier 14 from first battery 30, allowing separate optimization of each. In addition, inverter 20 may directly convert the high-voltage DC of controller/rectifier 14 to a corresponding high-voltage AC without the need for a step-up transformer, thus reducing system weight and cost. First DC/DC controller 24, configured as a bidirectional converter, may be arranged to operate in a reverse fashion with respect to the arrangement of FIG. 1, receiving the output of controller/rectifier 14 as an input at higher-voltage side 32 with the lower-voltage side of the first DC/DC controller being electrically coupled to bus 16 and battery 30.

A system controller and monitor 34 monitors system data 36 relating to the operational status of various portions of system 10, e.g., voltage and current at the various subsystem inputs and outputs, including, but not limited to, EMM 12, controller/rectifier 14, high-voltage bus 16, DC/AC inverter 20, AC power bus 26, and first battery 30. System data 36 may further include data relating to system faults, external commands, energy demands, battery state of charge, and so on. Controller 34 responds to the system data 36 in a predetermined manner to control the operation of one or more of the components and subsystems of the power management system including, without limitation, inverter 20 and first DC/DC converter 24 with electrical control signals 38, to regulate at least one of the voltage and current of at least one of the AC power bus 26, high-voltage bus 16, and charge first battery 30. In this configuration high-voltage bus 16 preferably provides power for loads such as an air conditioning compressor (not shown).

Figure 3:
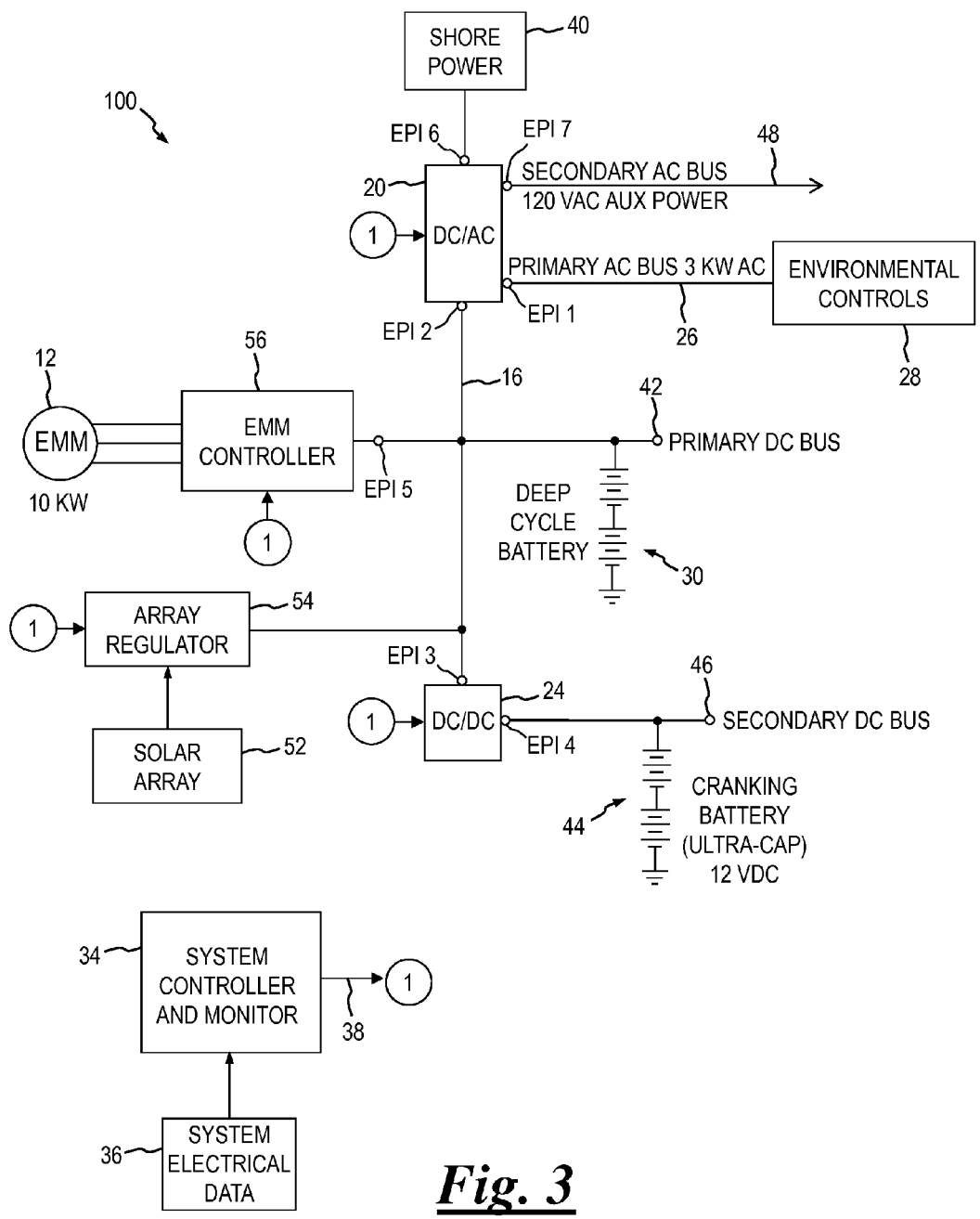
FIG. 3 is a schematic block circuit diagram of a topology of a power management and environmental control system according to another embodiment of the present invention.

A power management and environmental control system 100 is shown in FIG. 3 according to another embodiment of the present invention. In this embodiment DC/AC inverter 20 may be bidirectional and thus additionally capable of receiving and converting externally-supplied AC power (e.g., "shore power" 40) to a high-voltage DC and supplying the high-voltage DC to high-voltage bus 16 and hence to first battery 30, as well as a primary DC power bus 42. Thus, an external input AC voltage 40 to DC/AC inverter 20 may be rectified and supplied to high-voltage bus 16. First DC/DC converter 24 may in turn utilize this energy to charge a second battery 44 and provide electrical power to a secondary DC power bus 46.

First DC/DC converter 24 may be bidirectional, thus additionally capable of augmenting EMM 12 (and an optional first battery 30 if installed) by converting power from second battery 44 to a high voltage compatible with high-voltage bus 16 during periods of high load demand on inverter 20 where bus 16 is configured as a power source for the inverter. The amount of available additional power supplied to high-voltage bus 16 by first DC/DC converter 24 is limited by the capacity of the DC/DC converter. For example, if a 10 kW inverter 20 is supplied by a 7 kW EMM 12, a 3 kW DC/DC converter 24 is required to supply the additional power needed for the inverter to operate at its full capacity. Alternatively, the 3 kW could be supplied from first battery 30, or some combination of the two. This configuration also allows at least limited operation of power management system 100 from second battery 44 and/or first battery 30 when power is not being supplied by EMM 12.

Similarly, DC/AC inverter 20 may be additionally capable of augmenting other sources of power supply to high-voltage bus 16. In such an arrangement DC/AC inverter 20 may convert an external source of electrical power connected to shore power 40 to a voltage compatible with high-voltage bus 16, and provide the converted electrical power to the high-voltage bus.

DC/AC inverter 20 must be rated at the full AC output specification for system 100 since the inverter is the only source of AC power output. For example, if 10 kW of AC output power is required from AC power bus 26 of system 10 (FIGS. 1, 2) and 100 (FIG. 3), DC/AC inverter 20 must be configured to supply the entire 10 kW. Likewise, DC/AC inverter 20 must be rated to additionally provide the requisite amount of output power to a secondary AC power bus 48 shown in FIG. 3 for system 100.

DC/AC inverter 20 may be bidirectional and thus additionally capable of converting externally-supplied AC power (e.g., shore power 40) to a high-voltage DC and supplying the high-voltage DC to high-voltage bus 16, in turn charging first battery 30 and providing power to any accessories (not shown) connected to primary DC power bus 42. First DC/DC converter 24 may likewise utilize shore power 40 by receiving the shore power from high-voltage DC power bus 16 via DC/AC inverter 20 to charge second battery 44 and power secondary DC power bus 46. Shore power 40 thus allows operation of power management system 100 during times when power from EMM 12 is unavailable. A bidirectional arrangement of DC/AC inverter 20 may also be configured to provide output power to shore power 40. Similarly, a bidirectional arrangement of DC/AC inverter 20 may also be configured to receive input power from primary bus 26 and/or secondary bus 48.

Figure 4:
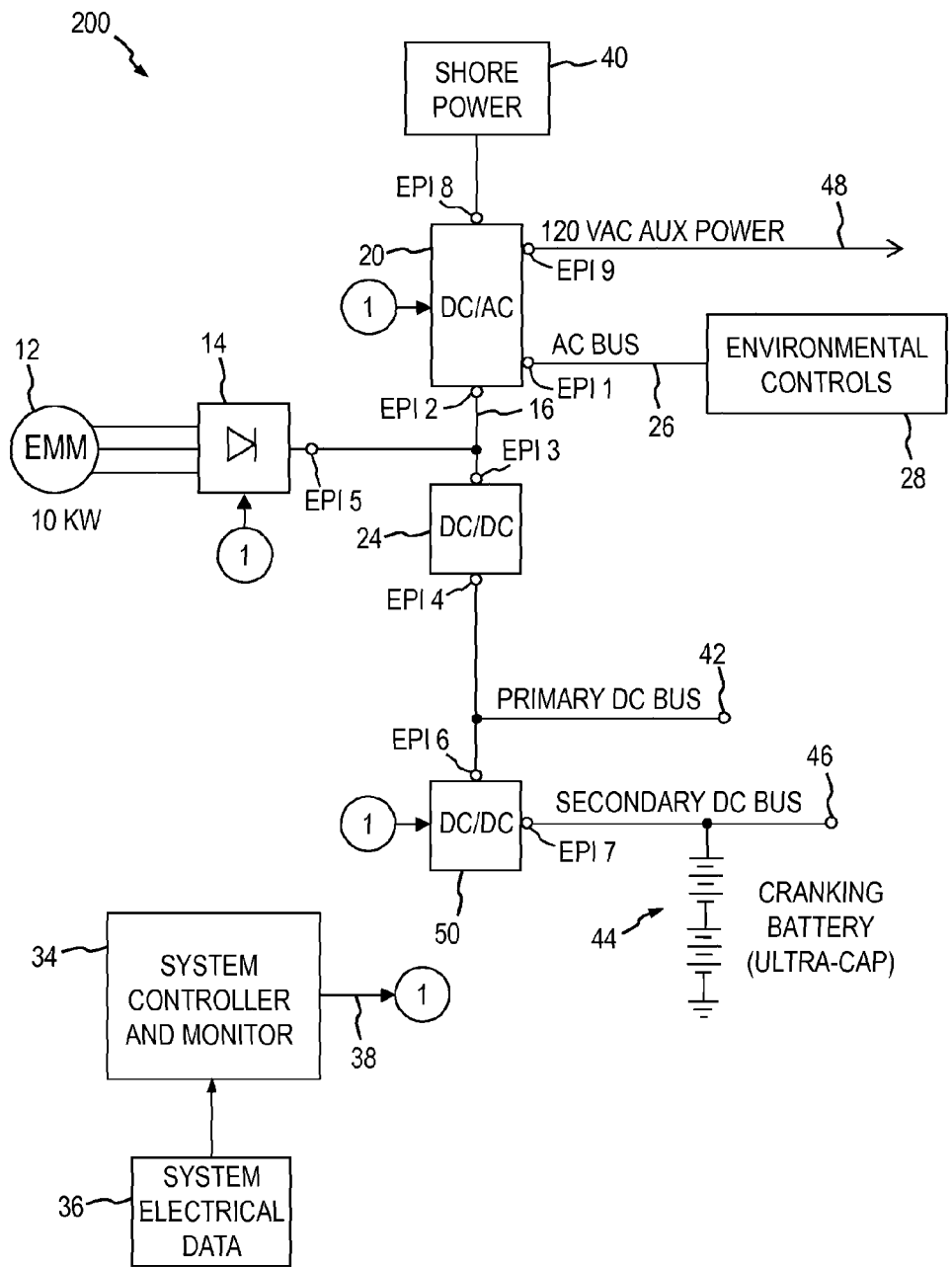
FIG. 4 is a schematic block circuit diagram of a topology of a power management and environmental control system according to yet another embodiment of the present invention.
Figure 5:
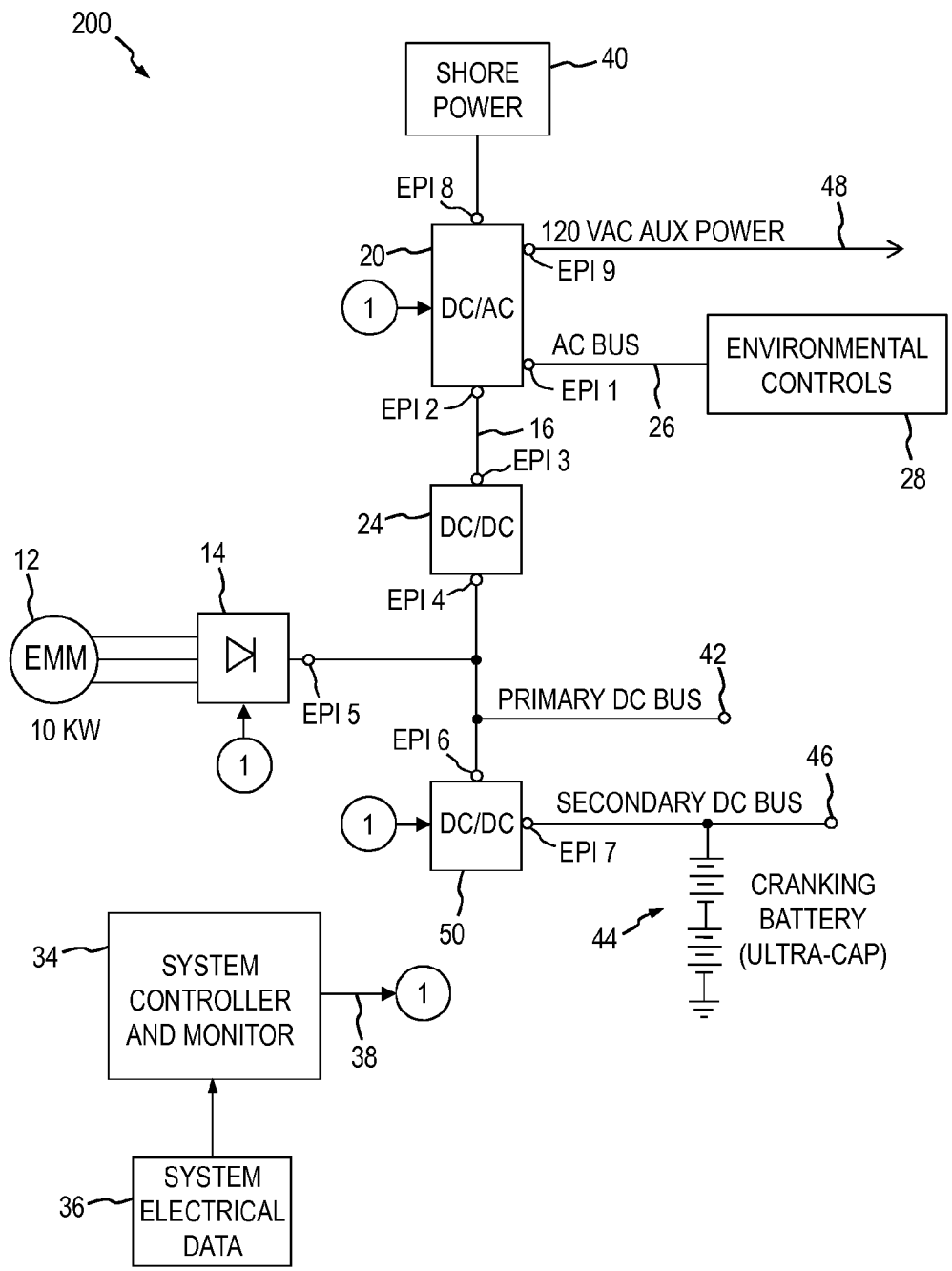
FIG. 5 shows an alternate arrangement of the system of FIG. 4.
Figure 6:
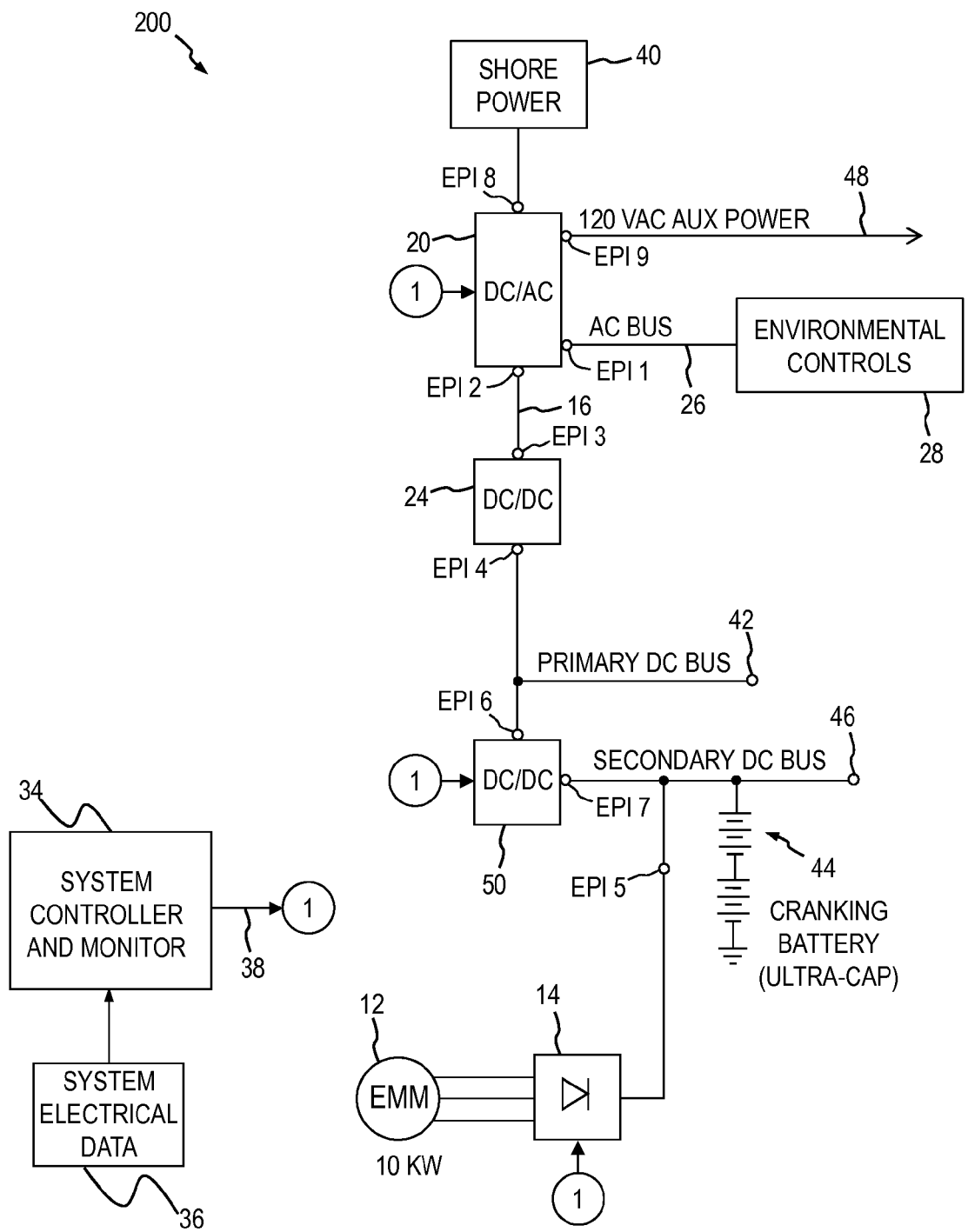
FIG. 6 shows another alternate arrangement of the system of FIG. 4.

A power management and environmental control system 200 is shown in FIGS. 4, 5 and 6 according to additional embodiments of the present invention. With an appropriately rated bidirectional first DC/DC converter 24, EMM 12 power can be supplied to or from any of high-voltage bus 16 or primary DC power bus 42. Thus, a high- or low-voltage EMM 12 may be used in system 200. For example, if a high-voltage EMM 12 is used, the rectified voltage output from controller/rectifier 14 may be connected directly to high-voltage bus 16, as shown in FIG. 4. One benefit of connecting the EMM 12 and controller/rectifier 14 directly to high-voltage bus 16 is that the high-voltage bus is de-coupled from an optional first battery 30 if a first battery is connected to the primary DC power bus 42. Note that optional first battery 30 is not shown in FIGS. 4, 5 and 6, but if installed is connected to primary DC power bus 42 in a manner similar to that shown in FIG. 3.

If a low-voltage EMM 12 is used, the output of controller/rectifier 14 may be directly connected to primary DC power bus 42 as shown in FIG. 5. In this configuration power for DC/AC inverter 20 is supplied to high-voltage bus 16 via a first bidirectional DC/DC converter 24 in the manner previously described.

Alternatively, controller/rectifier 14 may be connected directly to secondary DC power bus 46 as shown in FIG. 6. In this configuration the power is supplied to primary DC power bus 42 through a bidirectional second DC/DC converter 50 and, in turn, to high-voltage bus 16 through a bidirectional first DC/DC converter 24.

With reference to FIGS. 4, 5 and 6 together, if there is insufficient power to start the vehicle's prime mover engine (not shown) from cranking battery 44, power may be fed into system 200 via multiple buses from an external source, usually another vehicle which typically directly supplies power of a suitable voltage and current to battery 44. Alternatively, AC power from an external source may be fed back into the AC power bus 26 or a shore power input 40 of a bidirectional configuration of DC/AC inverter 20, rectified in the inverter, and routed through DC/DC converters 24, 50 to charge battery 44. If DC/AC inverter 20 and DC/DC converters 24, 50 have sufficient capacity, the external AC power may also be used in this manner to supply the DC power to start the vehicle's prime mover engine.

If second DC/DC converter 50 is bidirectional, it can also provide support for EMM 12 when high-voltage bus 16 is heavily loaded and further allows operation of system 200 from battery 44, if the EMM is not providing power. For example, DC/DC converters 24, 50 can be configured to supply additional power from battery 44 to high-voltage bus 16 in the manner previously described, to augment power being supplied to the high-voltage bus by EMM 12 during periods of heavy high-voltage bus loading, thus maintaining the voltage level of the high-voltage bus.

If DC/AC inverter 20 is bidirectional, the inverter can rectify AC power, supplied externally to the inverter through AC power bus 26 and/or shore power 40, to DC and supply the DC power to primary DC power bus 42 through first DC/DC converter 24. Charging of battery 44 may be accomplished through DC/DC converter 50 in the manner previously described. Thus, when external AC power is connected to DC/AC inverter 20 the external AC voltage may be rectified by the inverter and supplied to high-voltage bus 16 to provide power to DC/DC converters 24, 50 and charge battery 44, as well as supply power to primary DC power bus 42 and secondary DC power bus 46 in the manner previously described.

As can be seen from the foregoing discussion, recharging of the vehicle battery via a DC and/or AC converter allows an extra degree of control, allowing EMM operation to be segregated from the battery charge function. This architecture can be utilized to provide a rapid recharge of the battery without over-charging, by using a profiled voltage. At the same time the EMM can be operated at an optimum voltage for inverter efficiency, if an inverter is in the system. Alternatively, another optimum voltage may be selected such as for compatibility with one or more loads, thus optimizing fuel efficiency and minimizing wear of an EMM drive belt and the EMM itself, thus increasing the reliability of the vehicle electrical system. An advantage of operating the vehicle electrical system at higher voltage levels is that smaller wire gauges may be used to connect loads to the system, reducing weight and simplifying wire routing.

It should be noted that particulars of power conversion from AC to DC, DC to DC and DC to AC as well as bidirectional configurations have been omitted from the foregoing discussion, since various techniques for accomplishing such conversions and configurations are all applicable to the present invention. Likewise, particulars of the controllers, which may comprise digital and/or analog controls and may further include predetermined instructions and algorithms, such as computer programs, are also all applicable to the present invention. Thus, details for devising power inverters, power converters and control systems are left to the artisan.

It should also be noted that the inverter driving the air conditioning compressor, electrical heater or other motor loads may be built into the motor in the form of a "commutator" for a "DC" motor.

Some embodiments of the present invention may include alternate sources of energy. For example, with reference again to FIG. 3, a solar array 52 may be utilized to generate and supply electrical energy to system 100. The solar-generated electrical energy may be controlled by an array regulator 54 to regulate the voltage generated by solar array 52 and suitably interface the solar arrange with system 100. Array regulator 54 may have an input, to which solar array 52 is electrically coupled, and an output, which is coupled to a select portion of the power management system.

Adding a solar array may provide multiple benefits, such as offsetting the electrical load upon system 100 while the vehicle is moving, extending the duration of "engine off" operation, and charging batteries while the system is not powering loads. These non-limiting examples all aid to reduce fuel consumption and reduce greenhouse gas emissions. Similar solar-power arrangements may be incorporated with any of the systems described herein.

In some embodiments of the invention EMM 12 may be configured to additionally function as a motor to start the vehicle's prime mover engine, in which case the EMM is configured as a motor-generator. In this arrangement controller/rectifier 14 is operated in reverse to use energy from one or more of batteries 30, 44 and/or externally supplied power to cause rotation of the EMM 12 motor-generator and start the engine. Benefits of this may include, without limitation, reduced load on a conventional prime mover engine starter, reduced wear-and-tear on the starting components, a faster engine start which reduces emissions and wear on the engine, redundancy in the starter system, elimination of the standard vehicle start components and reduction in the number and/or capacity of the vehicle batteries.

In still other embodiments of the present invention controller/rectifier 14 may be replaced by an EMM controller 56, as shown in FIG. 3. EMM controller 56 may perform a variety of tasks, such as regulating bus voltages by controlling the field current of EMM 12 in response to changes in loading of a bus coupled to the EMM controller. EMM controller 56 may also act as an over-voltage protection device by removing field excitation from EMM 12 if the voltage of a bus connected to the EMM controller exceeds a predetermined level. Similar EMM controller arrangements may be incorporated with any of the systems described herein.

Depending upon the type of EMM 12 selected there may or may not be an associated EMM field current. For an EMM 12 having no field current component, EMM controller 56 may be configured to control power provided by the EMM in any suitable alternate manner. For example, EMM controller 56 may regulate power provided by EMM 12 by manipulating the interface of the EMM with an associated power bus in a predetermined manner, such as varying the impedance of the interface. EMM controller 56 may also provide voltage and/or current control of the power provided by EMM 12 to an associated power bus.

It should be noted that the various functional blocks of the systems described herein and shown in the figures may be provided as a single component having a plurality of inputs and/or outputs. Alternatively, a plurality of single-input and/or single-output components may be provided. As but one example, DC/AC converter 20 of FIG. 3 may be provided as a single component having a primary AC power bus 26 and a secondary AC power bus 48 as shown. Alternatively, a first DC/AC converter may be provided having a primary AC power bus 26 and a second DC/AC converter may be provided having a secondary AC power bus 48.

From the foregoing discussion it is apparent that the present invention includes a number of interfaces that may be configured as power inputs receiving electrical power, and also as power outputs, providing electrical power. These interfaces may each be termed an electrical power interface or "EPI." For further illustration, FIGS. 1-6 include numbered EPIs (e.g., "EPI 1," "EPI 2," etc.) for the various interfaces of the system, represented as a small circle or "bubble" in the figures. In FIGS. 1 and 2, DC/AC converter 20 has a first and a second electrical power interface, labeled EPI 1 and EPI 2 respectively. DC/DC converter 24 has a third and a fourth electrical power interface, labeled EPI 3 and EPI 4 respectively. FIG. 3 is similarly labeled and additionally shows a DC/AC converter 20 that further includes a shore power EPI, numbered EPI 6, and a secondary AC power bus, numbered EPI 7.

Likewise, FIGS. 4-6 show DC/AC converter 20 having a first and a second electrical power interface, labeled EPI 1 and EPI 2 respectively. First DC/DC converter 24 has a third and a fourth electrical power interface, labeled EPI 3 and EPI 4 respectively. A fifth EPI, labeled EPI 5, is intermediate power management system 200 and an EMM 12. Second DC/DC converter 50 has a sixth and a seventh electrical power interface, labeled EPI 6 and EPI 7 respectively. DC/AC converter 20 further includes a shore power EPI, numbered EPI 8, and a secondary AC power bus, numbered EPI 9.

Some or all of the aforementioned EPIs may be configured to be unidirectional such that a given EPI is only a power input or only a power output. Some or all of the aforementioned EPIs may also be configured to be bidirectional such that a given EPI may function as either a power input or a power output. Such bidirectionality may be inherent to the EPI, or may be made controllable and selectable, for example, by controller 34.

In the figures, battery 30 may be a deep cycle battery configured to have a long cycle life (e.g., from substantially full charge to substantially discharged). Battery 30 may be configured as an "accessory battery" to power various accessories installed on the vehicle and/or electrically coupled to the aforementioned power management systems by users. Battery 44 may be a "cranking battery," such as a flooded lead-acid battery, or in the alternative, a suitably sized ultra-capacitor, to start the prime mover engine of the vehicle.

While this invention has been shown and described with respect to a detailed embodiment thereof, it will be understood by those skilled in the art that changes in form and detail thereof may be made without departing from the scope of the claims of the invention.

What is claimed is:

1. A power management system, comprising:
    a direct current to alternating current (DC/AC) converter having a first electrical power interface (EPI) and a second EPI; and
    a switching arrangement having:
        a common electrical connection, the common electrical connection being configured to be coupled to an electromagnetic machine (EMM),
        a first electrical connection selectably electrically coupled to the common electrical connection, the first electrical connection further being electrically coupled to the second EPI, and
        a second electrical connection selectably electrically coupled to the common electrical connection,
    the first EPI, the second EPI and the common electrical connection being configurable as electrical power inputs and electrical power outputs.

2. The power management system of claim 1, further comprising:
    a DC/DC converter having a third EPI and a fourth EPI, the third EPI being electrically coupled to the second EPI, the second electrical connection further being electrically coupled to the fourth EPI, the third EPI and the fourth EPI being configurable as electrical power inputs and electrical power outputs.

3. The power management system of claim 2, wherein:
    a first DC voltage is coupled to the common electrical connection of the switching arrangement;
    the second electrical connection of the switching arrangement is electrically coupled to the common electrical connection;
    the DC/DC converter receives the first DC voltage at the fourth EPI and outputs a second DC voltage at the third EPI; and
    the DC/AC converter receives the second DC voltage at the second EPI and outputs an AC voltage at the first EPI.

4. The power management system of claim 2, wherein:
    a first DC voltage is coupled to the common electrical connection of the switching arrangement;

the first electrical connection of the switching arrangement is electrically coupled to the common electrical connection;

the DC/DC converter receives the first DC voltage at the third EPI and outputs a second DC voltage at the fourth EPI; and the DC/AC converter receives the first DC voltage at the second EPI and outputs an AC voltage at the first EPI.

5. The power management system of claim 2 wherein at least one of the DC/AC converter and the DC/DC converter are bidirectional.

6. The power management system of claim 2, further comprising a DC power bus electrically coupled to the fourth EPI.

7. The power management system of claim 2, further comprising a battery electrically coupled to the fourth EPI.

8. The power management system of claim 1, further comprising an AC power bus electrically coupled to the first EPI.

9. The power management system of claim 1, further comprising:
a controller/rectifier electrically coupled to the common electrical connection of the switching arrangement; and
an EMM electrically coupled to the controller/rectifier.

10. The power management system of claim 1, further comprising an environmental control electrically coupled to the first EPI.

11. A power management system comprising:
a direct current to alternating current (DC/AC) converter having a first electrical power interface (EPI) and a second EPI;
a DC/DC converter having a third EPI and a fourth EPI, the third EPI being electrically coupled to the second EPI; and
a fifth EPI configured to be coupled to an electromagnetic machine (EMM), the fifth EPI further being electrically coupled to the second EPI and the third EPI,
the first EPI, the second EPI, the third EPI, the fourth EPI and the fifth EPI being configurable as electrical power inputs and electrical power outputs.

12. The power management system of claim 11 wherein at least one of the DC/AC converter and the DC/DC converter are bidirectional.

13. The power management system of claim 11, further comprising a primary DC power bus electrically coupled to the second EPI, the third EPI and the fifth EPI.

14. The power management system of claim 13, further including a battery electrically coupled to the primary DC power bus.

15. The power management system of claim 11, further comprising a secondary DC power bus electrically coupled to the fourth EPI.

16. The power management system of claim 15, further including a battery electrically coupled to the secondary DC power bus.

17. The power management system of claim 11, further comprising:
an EMM controller electrically coupled to the fifth EPI; and
an EMM electrically coupled to the EMM controller.

18. The power management system of claim 11 wherein the DC/AC converter further includes a sixth EPI configured to be electrically coupled to shore power.

19. The power management system of claim 11 wherein the DC/AC converter further includes a seventh EPI, the first EPI being configured as a primary AC power bus and the seventh EPI being configured as a secondary AC power bus.

20. The power management system of claim 11, further including a solar array, the solar array being electrically coupled to the second EPI, the third EPI and the fifth EPI.

21. The power management system of claim 20, further including an array regulator having an input and an output,
the solar array being electrically coupled to the input of the array regulator, and
the second EPI, the third EPI and the fifth EPI being electrically coupled to the output of the array regulator.

22. The power management system of claim 11, further comprising an environmental control electrically coupled to the first EPI.

23. A power management system comprising:
a direct current to alternating current (DC/AC) converter having a first electrical power interface (EPI) and a second EPI;
a first DC/DC converter having a third EPI and a fourth EPI, the third EPI being electrically coupled to the second EPI;
a fifth EPI configured to be coupled to an electromagnetic machine (EMM), the fifth EPI further being electrically coupled to a select portion of the power management system; and
a second DC/DC converter having a sixth EPI and a seventh EPI, the sixth EPI being electrically coupled to the fourth EPI,
the first EPI, the second EPI, the third EPI, the fourth EPI, the fifth EPI, the sixth EPI and the seventh EPI being configurable as electrical power inputs and electrical power outputs.

24. The power management system of claim 23, further comprising a primary DC power bus electrically coupled to the fourth EPI and the sixth EPI.

25. The power management system of claim 23, further comprising a secondary DC power bus electrically coupled to the seventh EPI.

26. The power management system of claim 23 wherein at least one of the DC/AC converter, the first DC/DC converter and the second DC/DC converter are bidirectional.

27. The power management system of claim 23 wherein the fifth EPI is electrically coupled to the second EPI and the third EPI.

28. The power management system of claim 23 wherein the fifth EPI is electrically coupled to the fourth EPI and the fifth sixth EPI.

29. The power management system of claim 23 wherein the fifth EPI is electrically coupled to the seventh EPI.

30. The power management system of claim 23 wherein the DC/AC converter further includes an eighth EPI configured to be electrically coupled to shore power.

31. The power management system of claim 23 wherein the DC/AC converter further includes a ninth EPI, the first EPI being configured as a primary AC power bus and the ninth EPI being configured as a secondary AC power bus.

32. The power management system of claim 23, further comprising an environmental control electrically coupled to the first EPI.

* * * * *